United States Patent
Fukuoka et al.

(10) Patent No.: US 7,139,289 B2
(45) Date of Patent: Nov. 21, 2006

(54) DEVICE AND METHOD FOR ERROR AND SYNC DETECTION

(75) Inventors: Toshihiko Fukuoka, Osaka (JP); Taemi Wada, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 872 days.

(21) Appl. No.: 10/046,263

(22) Filed: Jan. 16, 2002

(65) Prior Publication Data

US 2002/0097751 A1 Jul. 25, 2002

(30) Foreign Application Priority Data

Jan. 22, 2001 (JP) ............... 2001-013632

(51) Int. Cl.
*H04J 3/06* (2006.01)
(52) U.S. Cl. ............... 370/503; 714/798; 714/799; 714/746
(58) Field of Classification Search ........ 370/503–506, 370/509–510, 512, 514, 242–245; 714/6, 714/12, 701–703, 746–758, 775–776, 781–785, 714/789, 798, 801, 804–805
See application file for complete search history.

(56) References Cited

U.S. PATENT DOCUMENTS 5,646,941 A  7/1997  Nishimura et al.
5,703,887 A * 12/1997 Heegard et al. ............ 714/775
2001/0005385 A1* 6/2001 Ichiguchi et al. .......... 370/535
2002/0004925 A1* 1/2002 Kodama et al. ............ 714/770
2003/0014763 A1* 1/2003 Chappell et al. ............ 725/111

FOREIGN PATENT DOCUMENTS

JP     8-179924    7/1996
JP    11-252062    9/1999

OTHER PUBLICATIONS

"*Digital Multi-Programme Systems for Television, Sound and Data Services for Cable Distribution*" ITU-T Recommendation J.83, pp. 1-60, Apr. 1997.

* cited by examiner

*Primary Examiner*—Doris H. To
*Assistant Examiner*—Thai Hoang
(74) *Attorney, Agent, or Firm*—McDermott Will & Emery LLP

(57) ABSTRACT

In an error and sync detection circuit, 7-bit byte data is rearranged by a data rearrangement block into 8-bit byte data where 1 byte is comprised of 8 bits. Thereafter, the 8-bit byte data is consistently used throughout the process, and each of such byte data is stored in a data storage block, which is a RAM. In a parity check block, a sync detection operation and a parity check operation are performed on the byte data from the data rearrangement block and the byte data from the data storage block, which has been delayed by 1496 clocks. Thus, the byte-to-byte conversion process eliminates the need for a parallel-to-serial conversion circuit and a serial-to-parallel conversion circuit. Use of a RAM for storing the byte data eliminates the need for a 1496-stage delay element.

8 Claims, 13 Drawing Sheets

FIG. 10

| time | Point8 | Point7 | Point6 |
|---|---|---|---|
| 1 | X7+a7 | X7 | X6 |
| 2 | X6+X7+a7+a6 | X6+X7+a7 | X5 |
| 3 | X5+X6+X7+a7+a6+a5 | X5+X6+X7+a7+a6 | X4 |
| 4 | X4+X5+X6+X7+a7+a6+a5+a4 | X4+X5+X6+X7+a7+a6+a5 | X3 |
| 5 | X3+X4+X5+X6+X7+a7+a6+a5+a4+a3 | X3+X4+X5+X6+X7+a7+a6+a5+a4 | X2+X7+a7 |
| 6 | X2+X3+X4+X5+X6+X7+a7+a6+a5+a4+a3+a2 | X2+X3+X4+X5+X6+a6+a5+a4+a3 | X1+X6+a6 |
| 7 | X1+X2+X3+X4+X5+a5+a4+a3+a2+a1 | X1+X2+X3+X4+a4+a3+a2+a1 | X0+X5+a5 |
| 8 | X0+X1+X2+X3+X4+a4+a3+a2+a1+a0 | X0+X1+X2+X3+a3+a2+a1 | X4+X7+a7+a4 |

| time | Point5 | Point4 | Point3 |
|---|---|---|---|
| 1 | X5 | X4 | X3 |
| 2 | X4 | X3 | X2+X7+a7 |
| 3 | X3 | X2+X7+a7 | X1+X6+a6 |
| 4 | X2+X7+a7 | X1+X6+a6 | X0+X5+a5 |
| 5 | X1+X6+a6 | X0+X5+a5 | X4+X7+a7+a4 |
| 6 | X0+X5+a5 | X4+X7+a7+a4 | X3+X6+X7+a7+a6+a3 |
| 7 | X4+X7+a7+a4 | X3+X6+X7+a7+a6+a3 | X2+X5+X6+a6+a5+a2 |
| 8 | X3+X6+X7+a7+a6+a3 | X2+X5+X6+X7+a6+a5+a2 | X1+X4+X5+X7+a7+a5+a4+a1 |

| time | Point2 | Point1 | Point0 |
|---|---|---|---|
| 1 | X2 | X1 | X0 |
| 2 | X1+X7+a7 | X0 | X7+a7 |
| 3 | X0+X6+X7+a7+a6 | X7+a7 | X6+X7+a7+a6 |
| 4 | X5+X6+a6+a5 | X6+X7+a7+a6 | X5+X6+X7+a7+a6+a5 |
| 5 | X4+X5+a5+a4 | X5+X6+X7+a7+a6+a5 | X4+X5+X6+X7+a7+a6+a5+a4 |
| 6 | X3+X4+a4+a3 | X4+X5+X6+X7+a7+a6+a5+a4 | X3+X4+X5+X6+X7+a7+a6+a5+a4+a3 |
| 7 | X2+X3+X7+a7+a3+a2 | X3+X4+X5+X6+X7+a7+a6+a5+a4+a3 | X2+X3+X4+X5+X6+a6+a5+a4+a3+a2 |
| 8 | X1+X2+X6+X7+a7+a6+a2+a1 | X2+X3+X4+X5+X6+a6+a5+a4+a3+a2 | X1+X2+X3+X4+X5+a5+a4+a3+a2+a1 |

FIG. 12

| time | Point9 | Point8 | Point7 | Point6 | Point5 |
|---|---|---|---|---|---|
| 1 | gxot1d7+X7+a7 | X7+a7 | X7 | X6 | X5 |
| 2 | gxot1d6+X6+X0+a7 | X6+X0+a7 | X6+X0 | X5 | X4+X0 |
| 3 | gxot1d5+X5+a7+a6 | X5+a7+a6 | X5+a7 | X4+X0 | X3+a7 |
| 4 | gxot1d4+X4+X0+a6+a5 | X4+X0+a6+a5 | X4+X0+a6 | X3+a7 | X2+a6 |
| 5 | gxot1d3+X3+a7+a5+a4 | X3+a7+a5+a4 | X3+a7+a5 | X2+a6 | X1+a5 |
| 6 | gxot1d2+X2+a6+a4+a3 | X2+a6+a4+a3 | X2+a6+a4 | X1+a5 | X0+a4 |
| 7 | gxot1d1+X1+a5+a3+a2 | X1+a5+a3+a2 | X1+a5+a3 | X0+a4 | a7+a3 |
| 8 | gxot1d0+X0+a4+a2+a1 | X0+a4+a2+a1 | X0+a4+a2 | a7+a3 | a6+a2 |

| time | Point4 | Point3 | Point2 | Point1 | Point0 |
|---|---|---|---|---|---|
| 1 | X4 | X3 | X2 | X1 | X0 |
| 2 | X3 | X2 | X1 | X0 | a7 |
| 3 | X2 | X1 | X0 | a7 | a6 |
| 4 | X1 | X0 | a7 | a6 | a5 |
| 5 | X0 | a7 | a6 | a5 | a4 |
| 6 | a7 | a6 | a5 | a4 | a3 |
| 7 | a6 | a5 | a4 | a3 | a2 |
| 8 | a5 | a4 | a3 | a2 | a1 |

DEVICE AND METHOD FOR ERROR AND SYNC DETECTION

BACKGROUND OF THE INVENTION

The present invention relates to a device and a method for performing an error detection operation and a sync detection operation when formatting digital data.

In downstream transmissions for Internet communications using cable modems or for CATV broadcasting in North America and other regions, a data format that is in compliance with the ITU-T J.83 ANNEX B specification is used. According to this specification, packet data including Reed-Solomon decoded data where 1 byte is comprised of 7 bits is converted to a transport stream data packet where 1 byte is comprised of 8 bits. In this process, it is necessary to perform a sync byte detection operation, an error detection operation, and a transport stream sync byte insertion operation for the 7-bit data packet. The series of operations for converting packet data including Reed-Solomon decoded data where 1 byte is comprised of 7 bits to a transport stream data packet where 1 byte is comprised of 8 bits will hereinafter be referred to as an "MPEG framing process".

The MPEG framing process is shown in detail in ITU-T Recommendation J.83, ANNEX B, Digital multi-program System B, B.4 MPEG-2 transport framing. Particularly, Figure B.3/J.83 shows an actual decoding circuit. The circuit is a syndrome computation circuit for performing the sync byte detection operation.

The specification of the circuit is such that the circuit receives data that is obtained by converting the 7-bit byte Reed-Solomon decoded data to serial bits, and performs a syndrome computation operation using the serial data so as to perform a parity check operation for error detection and to simultaneously perform a sync byte detection operation according to the result of the parity check operation. Then, after performing the parity check operation and the sync detection operation in a serial process, the output data is converted to 8-bit byte data where 1 byte is comprised of 8 bits, thus providing a transport stream data packet.

Typically, the parity check operation and the sync detection operation are performed by transport stream packets, i.e., by 8 bits×188 bytes=1504 bits, thereby requiring a delay of 1496 bits, at minimum, from the first byte to the last byte in 1 packet.

Accordingly, the decoder circuit shown in Figure B.3/J.83 employs a sequence of converting 7-bit byte data to serial bit data, performing a process using a 1497-stage delay element, and then converting the data to 8-bit byte data. Therefore, performing the entire process requires a parallel-to-serial conversion circuit, an MPEG2 sync detection syndrome computation circuit using the 1497-stage delay element shown in Figure B.3/J.83, and a serial-to-parallel conversion circuit, whereby the circuit scale is significantly large.

SUMMARY OF THE INVENTION

An object of the present invention is to provide an error and sync detection circuit that eliminates the need for the 1497-stage delay element and the serial-to-parallel conversion circuit in the output stage.

In order to accomplish this object, the present invention realizes a sequence of first converting 7-bit byte data to 8-bit byte data in a byte-to-byte conversion, and then performing the parity check operation and the sync detection operation by 8-bit bytes, in view of the fact that the MPEG framing process as a whole is a byte-to-byte conversion of converting 7-bit byte data, after performing various operations on the 7-bit byte data.

Specifically, an error and sync detection device of the present invention includes: a data rearrangement block for receiving 7-bit byte data and converting the 7-bit byte data to 8-bit byte data; a parity check block for receiving the 8-bit byte data, which has been converted by the data rearrangement block, and performing an MPEG sync byte detection operation and a parity-check-based error detection operation using the received byte data; and a data storage block, capable of receiving/outputting 8-bit byte data, for receiving and storing the 8-bit byte data, which has been converted by the data rearrangement block, and 8-bit intermediate byte data produced during a calculation process for the MPEG sync byte detection operation and the parity-check-based error detection operation performed by the parity check block, whereby MPEG packet data that is a collection of 8-bit byte data including a sync byte is output from the parity check block.

In one embodiment of the error and sync detection device, the data rearrangement block produces: first 8-bit byte data that is obtained by combining preceding byte data with an upper 1 bit of following byte data, with the preceding byte data being 7-bit byte data and the following byte data being also 7-bit byte data that is received following the preceding byte data; second 8-bit byte data that is obtained by combining lower 6 bits of the preceding byte data with upper 2 bits of following byte data; and third to seventh 8-bit byte data that are obtained similarly by combining lower n bits (n=5, 4, 3, 2, 1) of the preceding byte data with upper m bits (m=3, 4, 5, 6, 7) of the following byte data.

In one embodiment of the error and sync detection device: the parity check block includes a first calculation block and a second calculation block for performing a predetermined syndrome computation including an operation of delaying data by a predetermined number of clocks; the first calculation block receives the 8-bit byte data that is output from the data rearrangement block, and performs a calculation therewith before the operation of delaying the data by a predetermined number of clocks, so as to output intermediate byte data to the data storage block, the intermediate byte data representing a result of the calculation; and the second calculation block receives the intermediate byte data from the data storage block, and performs the calculation therewith before the operation of delaying the data by a predetermined number of clocks, so as to output 8-bit byte data that has undergone the MPEG sync byte detection operation and the parity-check-based error detection operation.

In one embodiment of the error and sync detection device, where pdatai[7:0] denotes input 8-bit byte data, gxot[7:0] denotes data representing a result of a calculation that is performed using the byte data pdatai[7:0], gxot7d[7:0] denotes 8-bit byte data obtained by delaying the calculation result data gxot[7:0] by 7 clocks according to a predetermined reference clock, gx[7:0] denotes an 8-bit intermediate variable that is used in a process of obtaining the calculation result data gxot[7:0], and "^" denotes an exclusive OR operation between bits, the first calculation block calculates the respective bits gx[7], gx[6], gx[5], gx[4], gx[3], gx[2], gx[1] and gx[0] of the 8-bit intermediate variable gx[7:0] respectively by the following expressions:

gx[0]=gxot7d[0];

gx[1]=gxot7d[1];

gx[2]=gxot7d[2]^gxot7d[0];

gx[3]=gxot7d[3]^gxot7d[1]^gxot7d[0];

gx[4]=gxot7d[4]^gxot7d[2]^gxot7d[1];

gx[5]=gxot7d[5]^gxot7d[3]^gxot7d[2];

gx[6]=gxot7d[6]^gxot7d[4]^gxot7d[3]; and gx[7]=gxot7d[7]^gxot7d[5]^gxot7d[4]^gxot7d[0], and the first calculation block calculates the respective bits gxot[7], gxot[6], gxot[5], gxot[4], gxot[3], gxot[2], gxot[1] and gxot[0] of the calculation result data gxot[7:0] respectively by the following expressions using the intermediate variable gx[7:0]:

gxot[7]=gx[7]^pdatai[7];

gxot[6]=gx[7]^gx[6]^pdatai[7]^pdatai[6];

gxot[5]=gx[7]^gx[6]^gx[5]^pdatai[7]^pdatai[6]^pdatai[5];

gxot[4]=gx[7]^gx[6]^gx[5]^gx[4]^pdatai[7]^pdatai[6]^pdatai[5]^pdatai[4];

gxot[3]=gx[7]^gx[6]^gx[5]^gx[4]^gx [3]^pdatai[7]^pdatai[6]^pdatai[5]^pdatai[4]^pdatai[3];

gxot[2]=gx[6]^gx[5]^gx[4]^gx[3]^gx[2]^pdatai[6]^pdatai[5]^pdatai[4]^pdatai[3]^pdatai[2];

gxot[1]=gx[5]^gx[4]^gx[3]^gx[2]^gx[1]^pdatai[5]^pdatai[4]^pdatai[3]^pdatai[2]^pdatai[1]; and gxot[0]=gx[4]^gx[3]^gx [2]^gx[1]^gx[0]^pdatai[4]^pdatai[3]^pdatai[2]^pdatai[1]^pdatai[0].

In one embodiment of the error and sync detection device, where dobx[7:0] denotes input 8-bit byte data, bxot1[7:0] denotes data representing a result of a calculation that is performed using the byte data dobx[7:0], dobx7d[7:0] denotes 8-bit byte data obtained by delaying the input byte data dobx[7:0] by 7 clocks according to a predetermined reference clock, bx[7:0] denotes an 8-bit intermediate variable that is used in a process of obtaining the calculation result data bxot1[7:0], gxot1d[7:0] denotes 8-bit byte data obtained by delaying the calculation result data gxot[7:0] from the first calculation block by 1 clock according to the reference clock, and "^" denotes an exclusive OR operation between bits, the second calculation block calculates the respective bits bx[7], bx[6], bx[5], bx[4], bx[3], bx[2], bx[1] and bx[0] of the 8-bit intermediate variable bx[7:0] respectively by the following expressions:

bx[0]=dobx7d[0];

bx[1]=dobx7d[1];

bx[2]=dobx7d[2];

bx[3]=dobx7d[3];

bx[4]=dobx7d[4];

bx[5]=dobx7d[5]^dobx[1];

bx[6]=dobx7d[6]^dobx[2]; and bx[7]=dobx7d[7]^dobx[3]^dobx[1], the second calculation block calculates the respective bits btox1[7], btox1[6], btox1[5], btox1[4], btox1[3], btox1[2], btox1[1] and btox1[0] of the calculation result data btox1[7:0] respectively by the following expressions:

btox1[7]=bx[7]^dobx[0];

btox1[6]=bx[6]^bx[0]^dobx[7];

btox1[5]=bx[5]^dobx[7]^dobx[6];

btox1[4]=bx[4]^bx[0]^dobx[6]^dobx[5];

btox1[3]=bx[3]^dobx[7]^dobx[5]^dobx[4];

btox1[2]=bx[2]^dobx[6]^dobx[4]^dobx[3];

btox1[1]=bx[1]^dobx[5]^dobx[3]^dobx[2]; and btox1[0]=bx[0]^dobx[4]^dobx[2]^dobx[1], and the second calculation block calculates 8-bit byte data bxot2[7:0], representing a result of a calculation that is performed based on the calculation result data btox1[7:0] and the calculation result data gxot[7:0] from the first calculation block, by the following expression:

bxot2[7:0]=btox1[7:0]^gxot1d[7:0].

In one embodiment of the error and sync detection device, the data storage block receives the 8-bit byte data from the data rearrangement block and 8-bit byte data representing the result of the calculation performed by the first calculation block, and outputs the two 8-bit byte data after holding the two 8-bit byte data respectively for predetermined periods of time.

In one embodiment of the error and sync detection device, the data storage block is a RAM.

In another aspect of the present invention, the error and sync detection device is implemented as a method.

Therefore, with the device and method for error and sync detection of the present invention, a series of 7-bit byte input data is first rearranged by the data rearrangement block to 8-bit byte data. The 8-bit byte data is input to and stored in the data storage block, and is also input to the parity check block. Each of the 8-bit byte data that has been input to the data storage block is delayed by a predetermined period of time (e.g., by 1496 clocks) before it is input to the parity check block. The parity check block performs the sync detection operation and the parity check operation by using the 8-bit byte data and those that have been delayed by a predetermined period of time.

Thus, 7-bit byte data is converted in a byte-to-byte conversion to 8-bit byte data, and thereafter the 8-bit byte data is consistently used throughout the sync detection operation and the parity check operation. This eliminates the need for a serial-to-parallel converter to be provided in the output stage, as in the prior art, thereby reducing the circuit scale.

Moreover, since the process is performed by using 8-bit byte data, a RAM can be used as the data storage block, in which case the byte data stored in the RAM may be output after being delayed by a predetermined period of time. Therefore, the circuit scale can be significantly reduced as compared to cases where a delay element having a large number of stages, e.g., 1000 stages or more, is necessary, as in the prior art.

Furthermore, since the calculation process is performed by 8-bit bytes, the calculation method is suitable for CPU operations, etc. Therefore, the present invention is not

BRIEF DESCRIPTION OF THE DRAWINGS

FIG. 10 is a diagram illustrating a calculation process performed by the circuit section.

FIG. 12 is a diagram illustrating a calculation process performed by the circuit section.

DETAILED DESCRIPTION OF THE INVENTION

An error and sync detection device in a preferred embodiment of the present invention will now be described with reference to the accompanying drawings.

Figure 1:
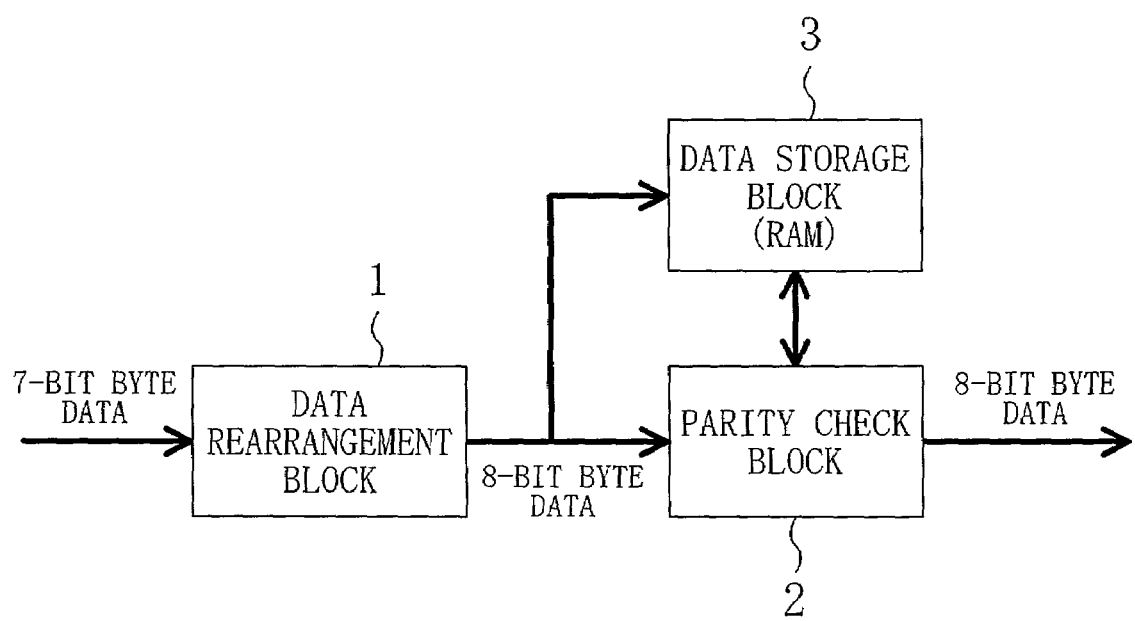
FIG. 1 is a block diagram illustrating a general configuration of an error and sync detection device in an embodiment of the present invention.

FIG. 1 is a block diagram illustrating a configuration of an error and sync detection device according to the present embodiment. Referring to FIG. 1, the error and sync detection device includes a data rearrangement block 1, a parity check block 2, and a data storage block (data storage device) 3. The data rearrangement block 1 receives 7-bit byte data and converts the 7-bit byte data to 8-bit byte data. The parity check block 2 performs an MPEG sync byte detection operation and a parity-check-based error detection operation by performing calculations using the 8-bit byte data that are successively input to the parity check block 2. The data storage block 3 stores data which needs to be stored while the parity check block 2 performs the MPEG sync byte detection operation and the parity-check-based error detection operation.

Figure 2:
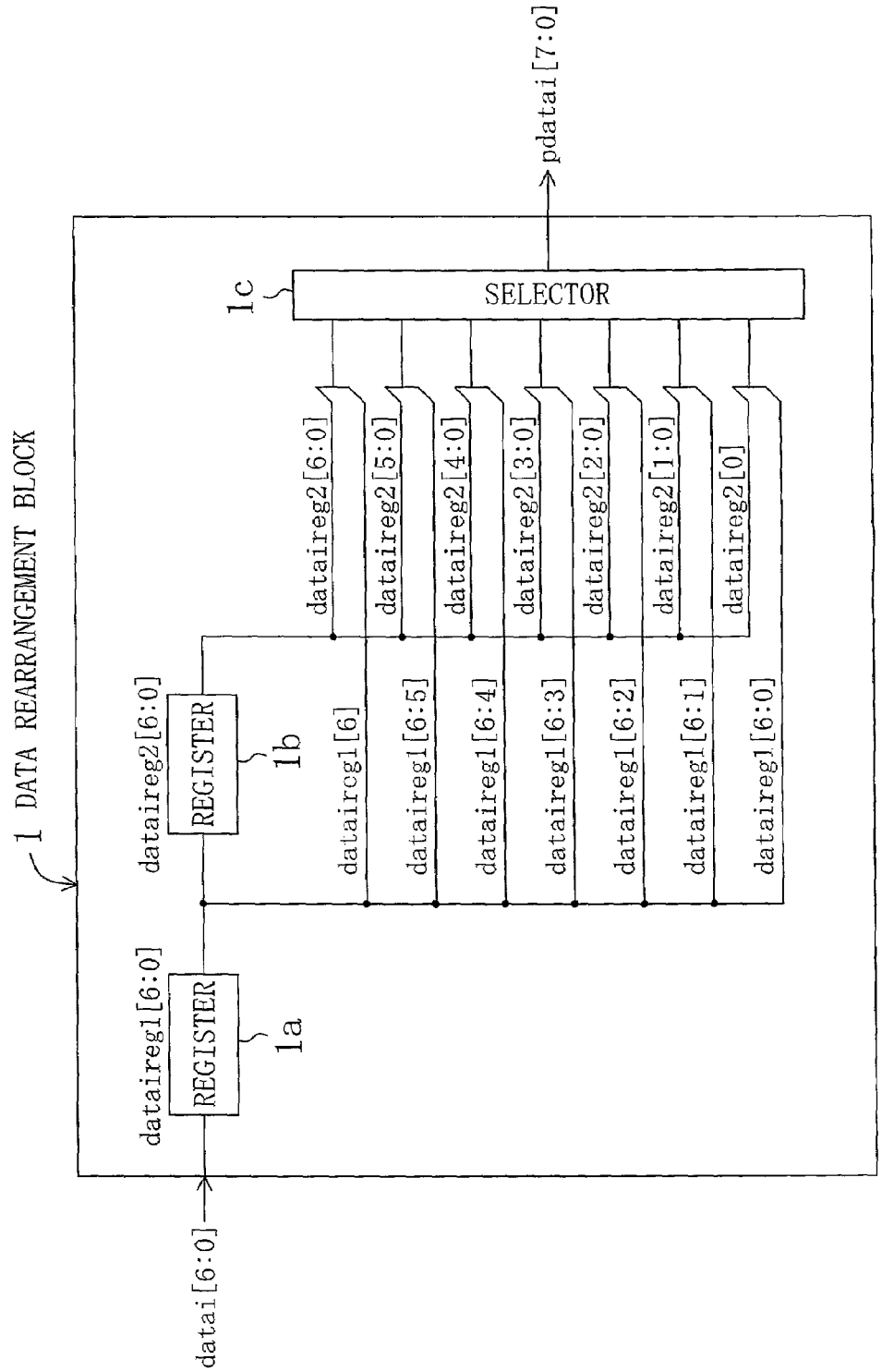
FIG. 2 is a diagram illustrating a configuration of a data rearrangement block provided in the error and sync detection device.
Figure 3:
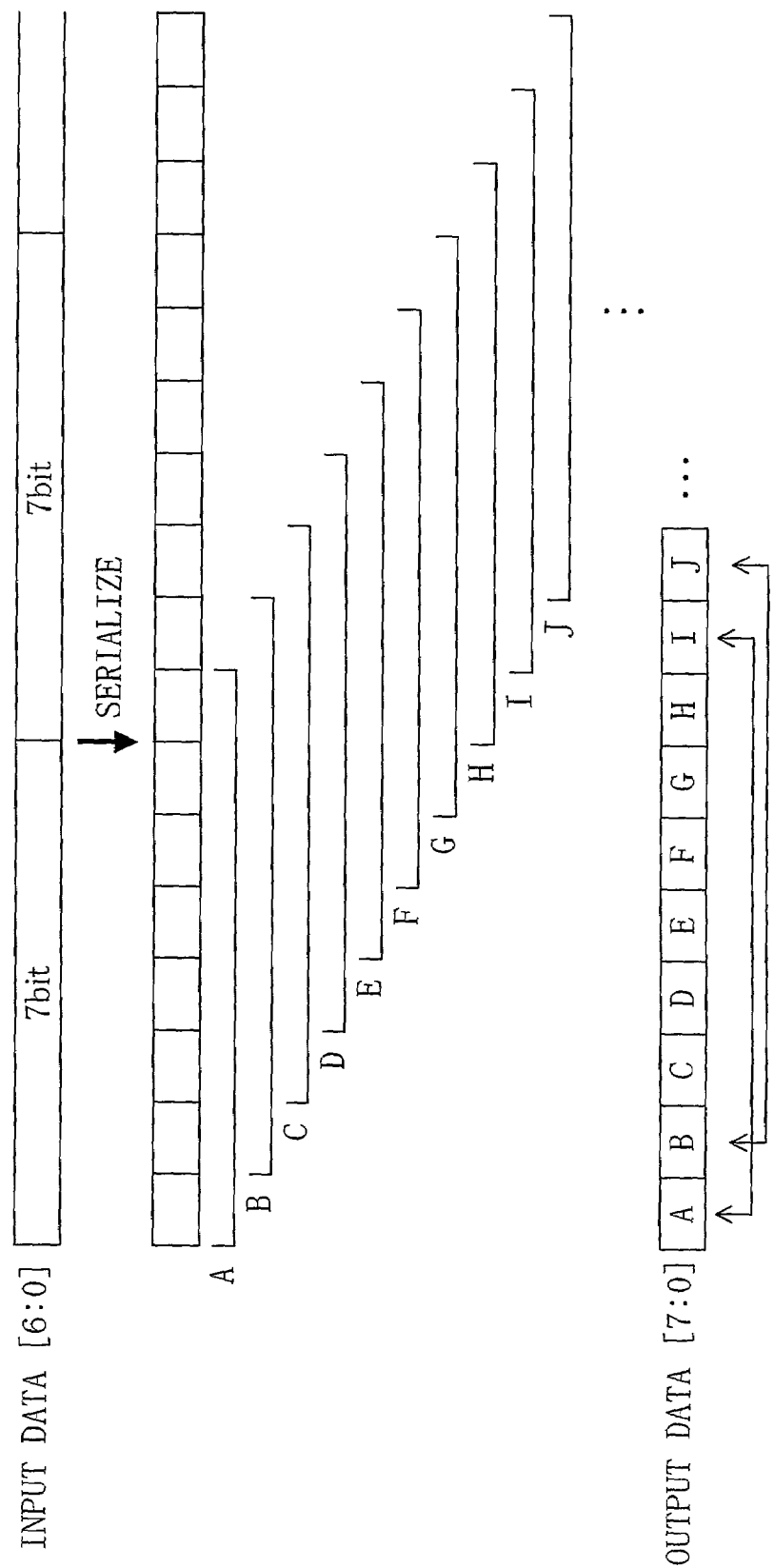
FIG. 3 is a diagram illustrating a data rearrangement method using the data rearrangement block.
Figure 4:
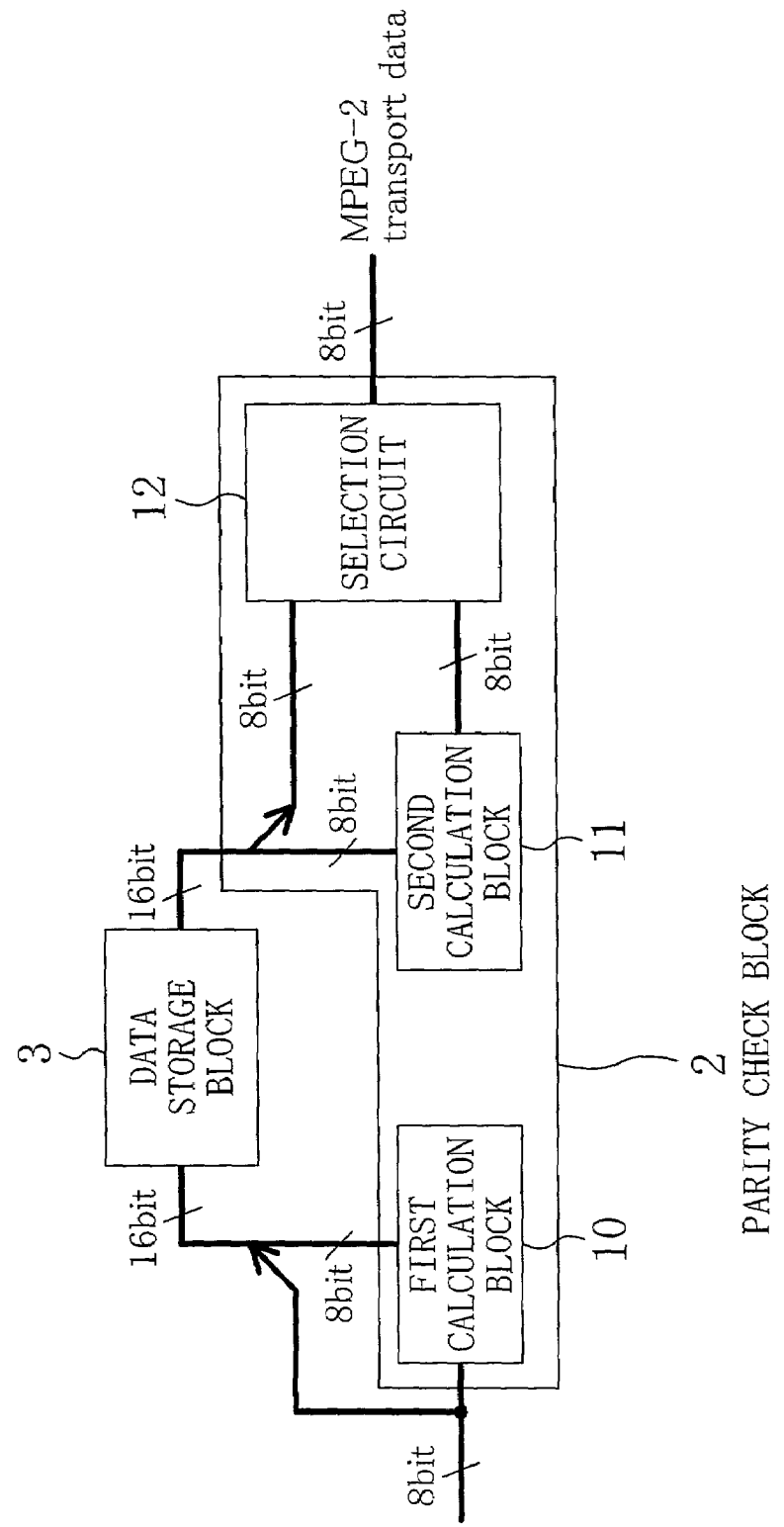
FIG. 4 is a block diagram illustrating a configuration of a parity check block provided in the error and sync detection device.

FIG. 2 illustrates an internal configuration of the data rearrangement block 1, and FIG. 3 illustrates a data conversion method of the data rearrangement block 1. FIG. 4 is a block diagram illustrating an internal configuration of the parity check block 2.

The parity check block 2 includes a first calculation block 10, a second calculation block 11, and a selection circuit 12. The function of the first and second calculation blocks 10 and 11 will be generally described below. The first calculation block 10 receives 8-bit byte data from the data rearrangement block 1, performs a calculation on the received 8-bit byte data, and outputs byte data representing the calculation result to the data storage block 3. The second calculation block 11 receives the 8-bit byte data representing the result of the calculation by the first calculation block 10 from the data storage block 3 after passage of a predetermined time period, performs a calculation on the received 8-bit byte data, and outputs data including an MPEG sync byte. The selection circuit 12 selectively outputs either one of the calculation result data from the second calculation block 11 and the byte data output from the data storage block 3, as 8-bit MPEG2 transport stream data.

The configuration and the operation of the data rearrangement block 1, the parity check block 2 and the data storage block 3 will now be described in detail by following the course of the process.

First, 7-bit byte data is input to the data rearrangement block 1. The 7-bit byte data is shifted by 1 bit at a time to generate 8-bit data. There are eight different byte data generation patterns. FIG. 3 shows a process diagram illustrating a method for converting the input data. First, the 7-bit data is serialized, from which 8-bit data (A, B, ..., J, ...) is produced by shifting the serial data by 1 bit for every clock. As can be seen from FIG. 3, data of an identical pattern is produced every 8 clocks. Specifically, 8-bit byte data starting from "A" and 8-bit byte data starting from "I" are of an identical combination pattern. Similarly, 8-bit byte data starting from "B" and 8-bit byte data starting from "J" are of an identical combination pattern.

FIG. 2 illustrates an internal configuration of the data rearrangement block 1 performing the above-described operation. Referring to FIG. 2, the data rearrangement block 1 includes two registers 1a and 1b and a selector 1c. Each of the registers 1a and 1b stores serialized 7-bit data. The registers 1a and 1b are connected in series with each other. Therefore, when one 7-bit byte ("preceding byte data") is stored in the register 1b, the following 7-bit byte ("following byte data") is stored in the register 1a. The selector 1c has first to seventh input terminals, and sequentially selects the input terminals one at a time. The first input terminal receives a total of 8 bits including all bits of the preceding byte data datareg2[6:0] and the upper 1 bit of the following byte data datareg1[6]. The second input terminal receives a total of 8 bits including the lower 6 bits of the preceding byte data datareg2[5:0] and the upper 2 bits of the following byte data datareg1[6:5]. The third input terminal receives a total of 8 bits including the lower 5 bits of the preceding byte data datareg2[4:0] and the upper 3 bits of the following byte data datareg1[6:4]. The fourth input terminal receives a total of 8 bits including the lower 4 bits of the preceding byte data datareg2[3:0] and the upper 4 bits of the following byte data datareg1[6:3]. The fifth input terminal receives a total of 8 bits including the lower 3 bits of the preceding byte data datareg2[2:0] and the upper 5 bits of the following byte data datareg1[6:2]. The sixth input terminal receives a total of 8 bits including the lower 2 bits of the preceding byte data datareg2[1:0] and the upper 6 bits of the following byte data datareg1 [6:1]. The seventh input terminal receives a total of 8 bits including the least significant bit of the preceding byte data datareg2[0] and all bits of the following byte data datareg1[6:0].

In this way, 7-bit byte data is rearranged into 8-bit byte data in the data rearrangement block 1, and is output to the parity check block 2.

Figure 13:
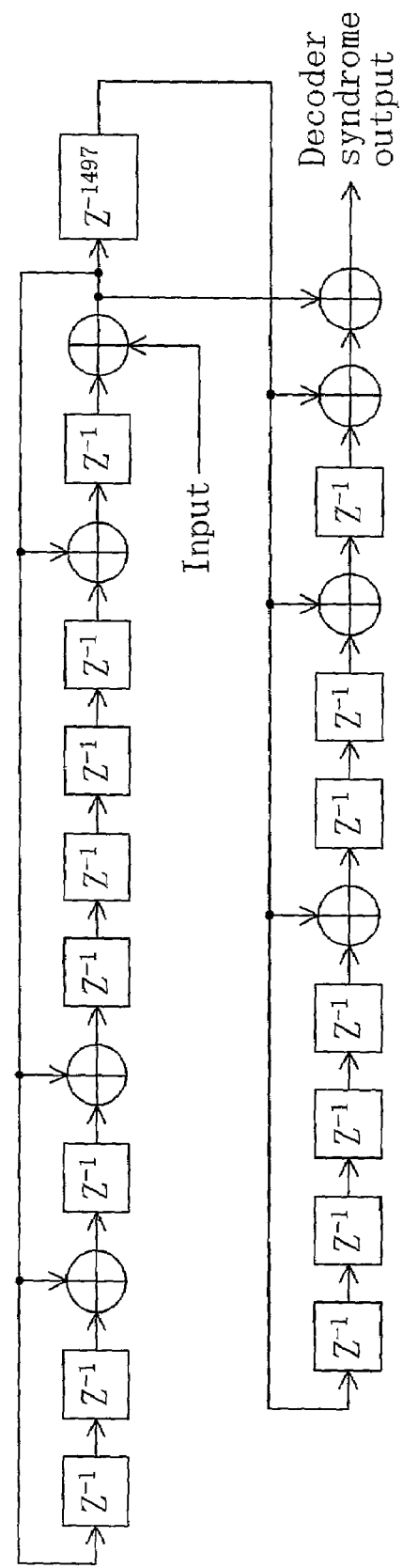
FIG. 13 is a diagram illustrating a general configuration of a decoder circuit that is proposed in ITU-T recommendation J.83 for an MPEG framing process.

As illustrated in FIG. 4, the parity check block 2 includes the first calculation block 10, the second calculation block 11 and the selection circuit 12. The first calculation block 10 and the second calculation block 11 perform a calculation equivalent to that performed by a specific decoder circuit shown in ITU-T Recommendation J.83, ANNEX B, Digital multi-program System B, B.4 MPEG-2 transport framing. The configuration of the specific decoder circuit is shown in FIG. 13. The decoder circuit of the figure is a circuit for computing a syndrome based on the following equation:

$$f(x)=[1+x^{1497}b(x)]/g(x)$$

where $g(x)=1+x+x^5+x^6+x^8$, and $$b(x)=1+x+x^3+x^7.$$

First, the 8-bit byte data from the data rearrangement block 1 is input to the first calculation block 10 and at the same time is input to and stored in the data storage block 3.

When calculating a syndrome based on the equation above, the first and second calculation blocks 10 and 11 perform a parallel process by 8-bit byte data received from the data rearrangement block 1. The first calculation block 10 performs a process equivalent to that performed by a circuit section that is preceding (on the input side of) the 1497-stage delay element in the decoder circuit of FIG. 13, and the second calculation block 11 performs a process equivalent to that performed by a circuit section that is following (on the output side of) the 1497-stage delay element in the decoder circuit of FIG. 13. In order to perform this process, the process of the circuit section (whose circuit diagram is shown in FIG. 9) preceding (on the input side of) the 1497-stage delay element in the decoder circuit of FIG. 13 will be analyzed.

Figure 9:
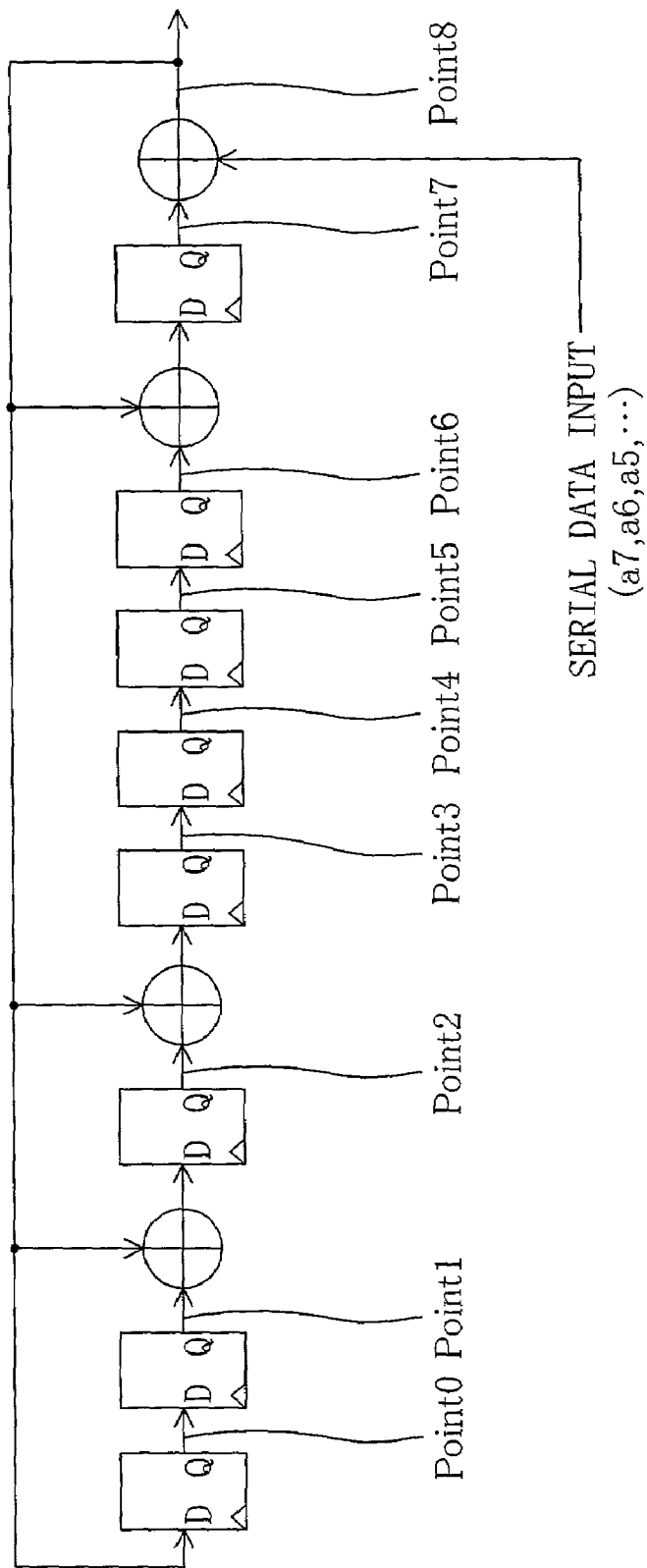
FIG. 9 is a diagram illustrating a section of a decoder circuit, before a 1947-stage delay, that is proposed in ITU-T recommendation J.83 for an MPEG framing process.

In the circuit section illustrated in FIG. 9, the values at Point 0 to Point 8 change over time as illustrated in FIG. 10. FIG. 10 illustrates changes of the values over 8 clocks according to a predetermined reference clock, where the values at Point 7 to Point 0 are X7 to X0, respectively, at a certain point in time and the circuit section starts receiving serial input data a7, a6, . . . , a0 from the point in time. It is assumed that the time passes from time 1 to time 2, time 3, and so on. The result of the calculation process on the serial data is the value at Point 8. The serial process calculations at Point 8 from time 1 to time 8 are performed in the first calculation block 10 in a simultaneous, parallel manner at a certain time, thereby realizing a parallel calculation.

The 8-bit byte data input to the first calculation block 10 is subjected to a byte process by the following expressions. Specifically, where pdatai[7:0] denotes the input 8-bit byte data, gxot[7:0] denotes data representing the result of the calculation that is performed using the byte data pdatai[7:0], gxot7d[7:0] denotes 8-bit byte data obtained by delaying the calculation result data gxot[7:0] by 7 clocks according to a predetermined reference clock, gx[7:0] denotes an 8-bit intermediate variable that is used in the process of obtaining the calculation result data gxot[7:0], and "^" denotes an exclusive OR operation between bits, the respective bits gx[7], gx[6], gx[5], gx[4], gx[3], gx[2], gx[1] and gx[0] of the 8-bit intermediate variable gx[7:0] are calculated respectively by the following expressions:

gx[0]=gxot7d[0]  (1-0);

gx[1]=gxot7d[1]  (1-1);

gx[2]=gxot7d[2]^gxot7d[0]  (1-2);

gx[3]=gxot7d[3]^gxot7d[1]^gxot7d[0]  (1-3);

gx[4]=gxot7d[4]^gxot7d[2]^gxot7d[1]  (1-4);

gx[5]=gxot7d[5]^gxot7d[3]^gxot7d[2]  (1-5);

gx[6]=gxot7d[6]^gxot7d[4]^gxot7d[3]  (1-6);

and gx[7]=gxot7d[7]^gxot7d[5]^gxot7d[4]^gxot7d[0]  (1-7), and the respective bits gxot[7], gxot[6], gxot[5], gxot[4], gxot[3], gxot[2], gxot[1] and gxot[0] of the calculation result data gxot[7:0] are calculated respectively by the following expressions using the intermediate variable gx[7:0]:

gxot[7]=gx[7]^pdatai[7]  (2-7);

gxot[6]=gx[7]^gx[6]^pdatai[7]^pdatai[6]  (2-6);

gxot[5]=gx[7]^gx[6]^gx[5]^pdatai[7]^pdatai[6]^pdatai[5]  (2-5);

gxot[4]=gx[7]^gx[6]^gx[5]^gx[4]^pdatai[7]^pdatai[6]^pdatai[5]^pdatai[4]  (2-4);

gxot[3]=gx[7]^gx[6]^[5]^[4]^gx[3]^pdatai[7]^pdatai[6]^pdatai[5]^pdatai[4]^pdatai[3]  (2-3);

gxot[2]=gx[6]^gx[5]^gx[4]^gx[3]^gx[2]^pdatai[6]^pdatai[5]^pdatai[4]^pdatai[3]^pdatai[2]  (2-2)

gxot[1]=gx[5]^gx[4]^gx[3]^gx[2]^gx[1]^pdatai[5]^pdatai[4]^pdatai[3]^pdatai[2]^pdatai[1]  (2-1);

and gxot[0]=gx[4]^gx[3]^gx[2]^gx[1]^gx[0]^pdatai[4]^pdatai[3]^pdatai[2]^[1]^pdatai[0]  (2-0).

Figure 5:
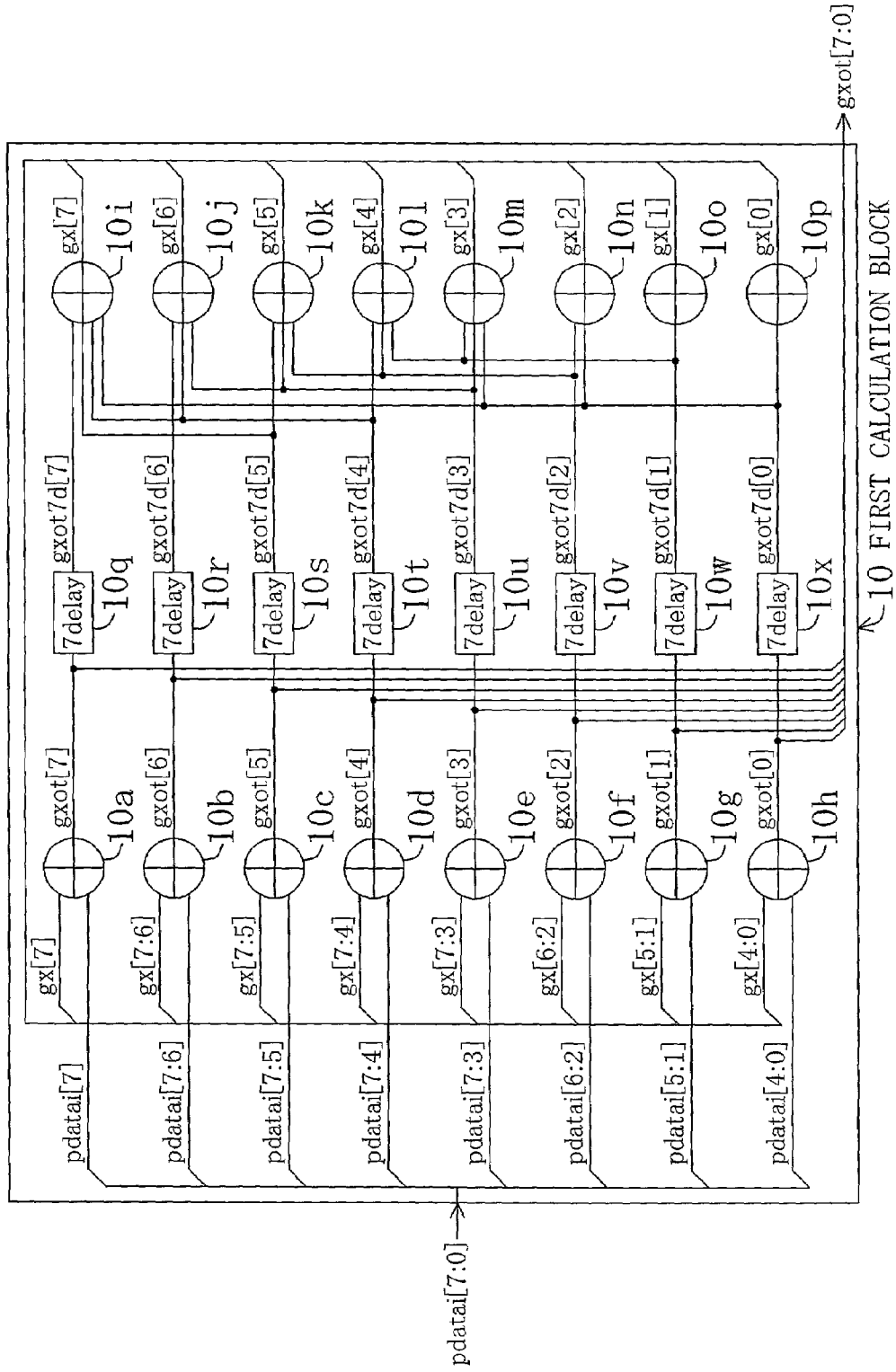
FIG. 5 is a diagram illustrating a configuration of a first calculation block provided in the parity check block.

FIG. 5 illustrates an internal configuration of the first calculation block 10. An exclusive OR circuit (hereinafter referred to as an "XOR circuit") 10a in FIG. 5 calculates Expression (2-7), an XOR circuit 10b calculates Expression (2-6), an XOR circuit 10c calculates Expression (2-5), an XOR circuit 10d calculates Expression (2-4), an XOR circuit 10e calculates Expression (2-3), an XOR circuit 10f calculates Expression (2-2), an XOR circuit 10g calculates Expression (2-1), and an XOR circuit 10h calculates Expression (2-0). Moreover, an XOR circuit 10i calculates Expression (1-7), an XOR circuit 10j calculates Expression (1-6), an XOR circuit 10k calculates Expression (1-5), an XOR circuit 10l calculates Expression (1-4), an XOR circuit 10m calculates Expression (1-3), an XOR circuit 10n calculates Expression (1-2), an XOR circuit 10o calculates Expression (1-1), and an XOR circuit 10p calculates Expression (1-0). A delay circuit 10q delays the calculation result data gxot[7] by 7 clocks, a delay circuit 10r delays the calculation result data gxot[6] by 7 clocks, a delay circuit 10s delays the calculation result data gxot[5] by 7 clocks, a delay circuit 10t delays the calculation result data gxot[4] by 7 clocks, a delay circuit 10u delays the calculation result data gxot[3] by 7 clocks, a delay circuit 10v delays the calculation result data gxot[2] by 7 clocks, a delay circuit 10w delays the calculation result data gxot[1] by 7 clocks, and a delay circuit 10x delays the calculation result data gxot[0] by 7 clocks.

The values at Point 8 from time 1 to time 8 in FIG. 10 coincide with bit 7 to bit 0, respectively, in the first calculation block 10.

The 8-bit byte data that has been processed in the first calculation block 10 is passed to the data storage block 3 and delayed by 1496 clocks, after which it is passed to the second calculation block 11.

Figure 11:
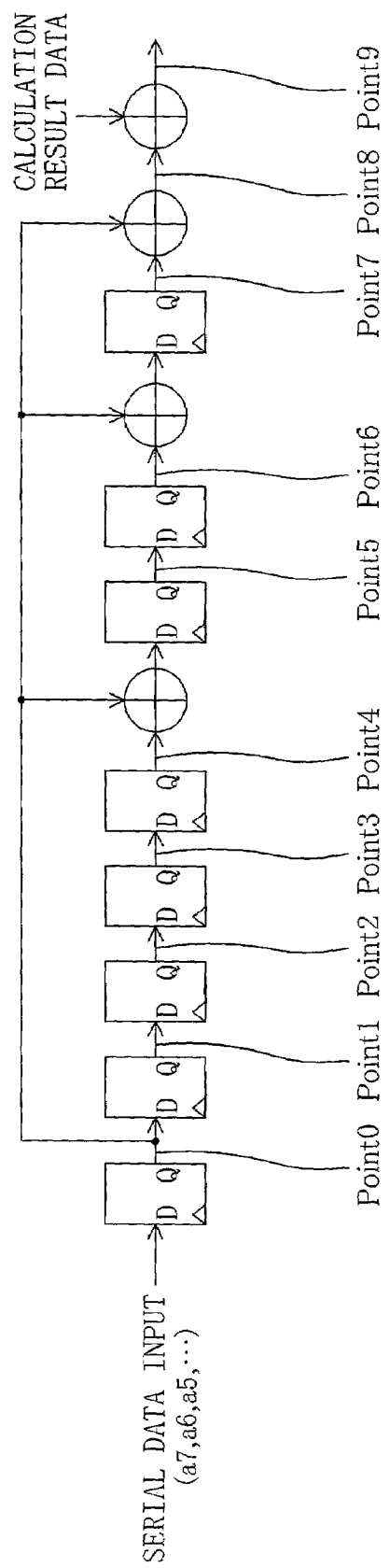
FIG. 11 is a diagram illustrating a section of a decoder circuit, after a 1947-stage delay, that is proposed in ITU-T recommendation J.83 for an MPEG framing process.

Next, the process performed by the second calculation block 11 will be described. As described above, the second calculation block 11 performs a process equivalent to that performed by a circuit section that is following (on the output side of) the 1497-stage delay element in the decoder circuit of FIG. 13. FIG. 11 illustrates the circuit section that is following (on the output side of) the 1497-stage delay element in the decoder circuit of FIG. 13. The process performed by the circuit section of FIG. 11 will now be analyzed. FIG. 12 illustrates changes over time of the values at Point 0 to Point 9 shown in FIG. 11. FIG. 12 illustrates changes of the values over 8 clocks according to a predetermined reference clock, where the values at Point 7 to Point 0 are X7 to X0, respectively, at a certain point in time and the circuit section starts receiving serial input data a7, a6, . . . , a0 from the point in time. It is assumed that the time passes from time 1 to time 2, time 3, and so on. The result of the calculation process on the serial data is the value at Point 8. The serial process calculations at Point 8 from time 1 to time 8 are performed in the second calculation block 11 in a simultaneous, parallel manner at a certain time, thereby realizing a parallel calculation. The calculation at Point 9 is performed in a serial process from time 1 to time 8 by using data that is obtained by delaying the output result data from the first calculation block 10 and the calculation result data at Point 8. The serial process calculations at Point 8 and Point 9 from time 1 to time 8 are performed in the second calculation block 11 in a simultaneous, parallel manner at a certain time, thereby realizing a parallel calculation.

The 8-bit byte data input to the second calculation block 11 is subjected to a byte process by the following expressions. Specifically, where dobx[7:0] denotes the input 8-bit byte data, btox1[7:0] denotes data representing the result of the calculation that is performed using the byte data dobx[7:0], dobx7d[7:0] denotes 8-bit byte data obtained by delaying the input byte data dobx[7:0] by 7 clocks according to a predetermined reference clock, bx[7:0] denotes an 8-bit intermediate variable that is used in the process of obtaining the calculation result data btox1[7:0], gxot1d[7:0] denotes 8-bit byte data obtained by delaying the calculation result data gxot[7:0] from the first calculation block 10 by 1 clock according to the reference clock, and "^" denotes an exclusive OR operation between bits, the respective bits bx[7], bx[6], bx[5], bx[4], bx[3], bx[2], bx[1] and bx[0] of the 8-bit intermediate variable bx[7:0] are calculated respectively by the following expressions:

$$bx[0]=dobx7d[0] \quad (3\text{-}0);$$

$$bx[1]=dobx7d[1] \quad (3\text{-}1);$$

$$bx[2]=dobx7d[2] \quad (3\text{-}2);$$

$$bx[3]=dobx7d[3] \quad (3\text{-}3);$$

$$bx[4]=dobx7d[4] \quad (3\text{-}4);$$

$$bx[5]=dobx7d[5]\char`\^dobx[1] \quad (3\text{-}5);$$

$$bx[6]=dobx7d[6]\char`\^dobx[2] \quad (3\text{-}6);$$

and $$bx[7]=dobx7d[7]\char`\^dobx[3]\char`\^dobx[1] \quad (3\text{-}7),$$

and the respective bits btox1[7], btox1[6], btox1[5], btox1[4], btox1[3], btox1[2], btox1[1] and btox1[0] of the calculation result data btox1[7:0] are calculated respectively by the following expressions using the intermediate variable bx[7:0] and the 8-bit byte input data dobx[7:0]:

$$btox1[7]=bx[7]\char`\^dobx[0] \quad (4\text{-}7);$$

$$btox1[6]=bx[6]\char`\^bx[0]\char`\^dobx[7] \quad (4\text{-}6);$$

$$btox1[5]=bx[5]\char`\^dobx[7]\char`\^dobx[6] \quad (4\text{-}5);$$

$$btox1[4]=bx[4]\char`\^bx[0]\char`\^dobx[6]\char`\^dobx[5] \quad (4\text{-}4);$$

$$btox1[3]=bx[3]\char`\^dobx[7]\char`\^dobx[5]\char`\^dobx[4] \quad (4\text{-}3);$$

$$btox1[2]=bx[2]\char`\^dobx[6]\char`\^dobx[4]\char`\^dobx[3] \quad (4\text{-}2);$$

$$btox1[1]=bx[1]\char`\^dobx[5]\char`\^dobx[3]\char`\^dobx[2] \quad (4\text{-}1);$$

and $$btox1[0]=bx[0]\char`\^dobx[4]\char`\^dobx[2]\char`\^dobx[1] \quad (4\text{-}0).$$

Moreover, bxot2[7:0] is calculated by the following expression using btox1[7:0] and gxot1d[7:0]:

$$bxot2[7:0]=btox1[7:0]\char`\^gxot1d[7:0] \quad (5).$$

Figure 6:
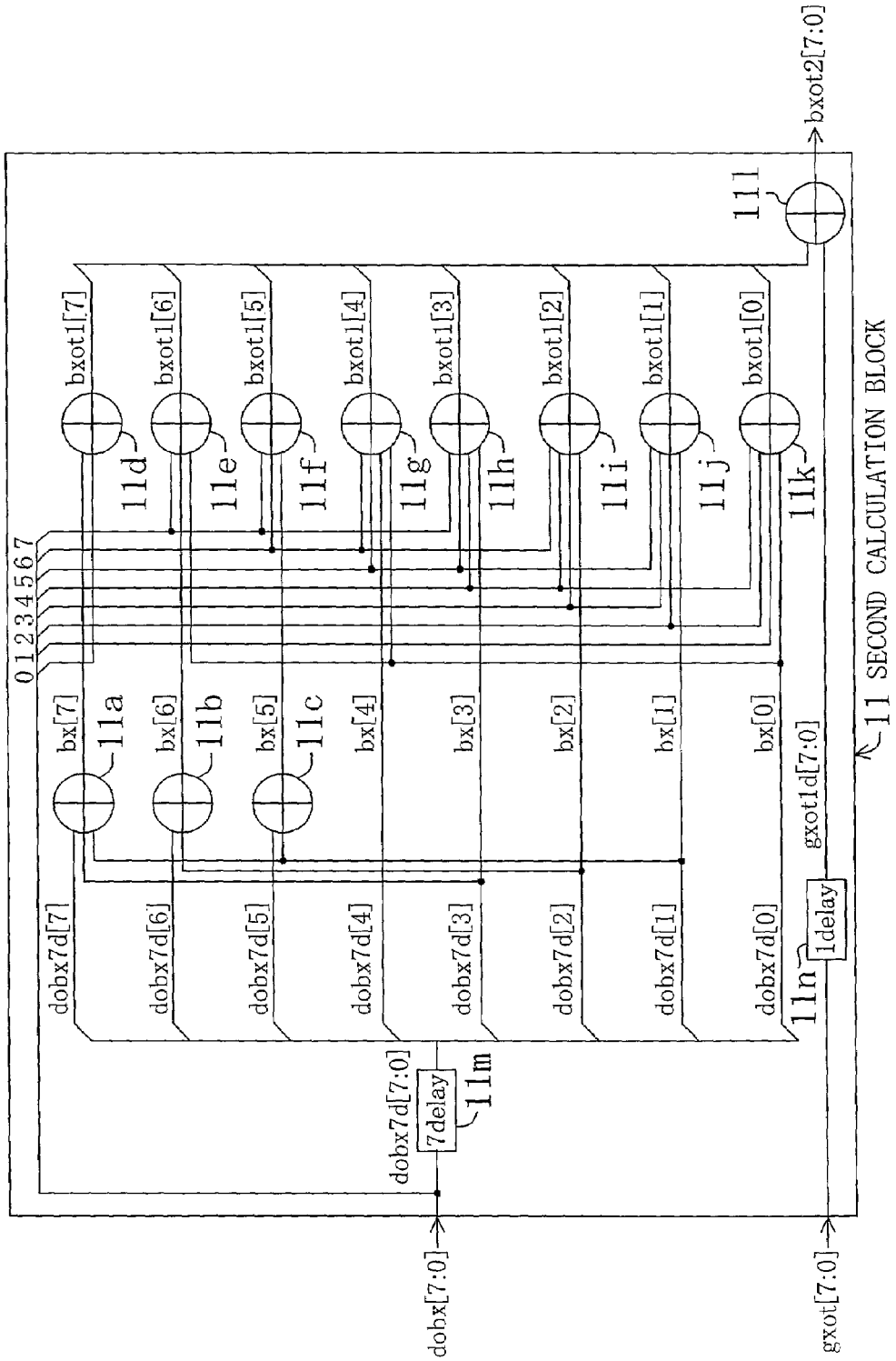
FIG. 6 is a diagram illustrating a configuration of a second calculation block provided in the parity check block.

FIG. 6 illustrates an internal configuration of the second calculation block 11 for performing the calculation as described above. In FIG. 6, an XOR circuit 11*a* calculates Expression (3-7), an XOR circuit 11*b* calculates Expression (3-6), an XOR circuit 11*c* calculates Expression (3-5), an XOR circuit 11*d* calculates Expression (4-7), an XOR circuit 11*e* calculates Expression (4-6), an XOR circuit 11*f* calculates Expression (4-5), an XOR circuit 11*g* calculates Expression (4-4), an XOR circuit 11*h* calculates Expression (4-3), an XOR circuit 11*i* calculates Expression (4-2), an XOR circuit 11*j* calculates Expression (4-1), and an XOR circuit 11*k* calculates Expression (4-0). Moreover, an XOR circuit 11*l* calculates Expression (5). In addition, a delay circuit 11*m* delays the input 8-bit byte data dobx[7:0] by 7 clocks, and a delay circuit 11*n* delays the calculation result data gxot[7:0] from the first calculation block 10 by 1 clock.

The values at Point 8 from time 1 to time 8 in FIG. 12 coincide with bit 7 to bit 0, respectively, of the output result data from the second calculation block 11.

The parity check block 2 of the present embodiment performs parity check by performing calculations on byte data in the first calculation block 10 and the second calculation block 11, and the parity check block 2 outputs '47hex' if no error is detected during the transmission of every 188 bytes of 8-bit byte data, or does not output '47hex' if any error is detected. As a result, a parity check operation can be performed through a sync byte detection operation by detecting '47hex'.

The selection circuit 12 in the parity check block 2 receives 8-bit byte data that is input thereto from the data storage block 3 and data that represents the parity check result from the second calculation block 11. Then, if the output result data from the second calculation block 11 is '47hex', which indicates a sync byte at the beginning of a transport stream packet, the selection circuit 12 selectively outputs the '47hex' data. Otherwise, the selection circuit 12 selectively outputs the normal 8-bit byte data that is input thereto from the data storage block 3.

Next, the configuration and the operation of the data storage block 3 will be described. In the present embodiment, the data storage block 3 is a 1496-word, 16-bit, 2-port RAM, and is used for delaying input signals and calculation data by 1496 clocks.

Figures 7A, 7B:
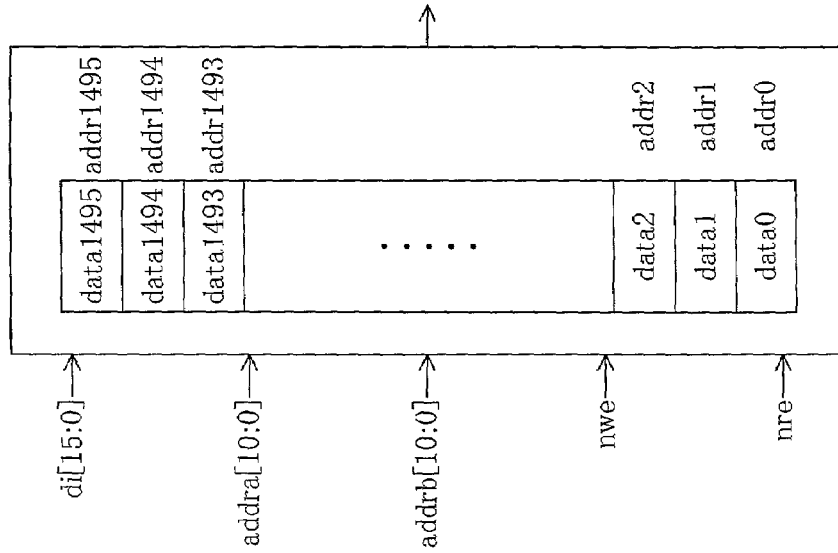
FIG. 7A is a diagram illustrating data being stored in a RAM of a data storage block provided in the error and sync detection device.
FIG. 7B is a diagram illustrating changes over time of data being input to and output from the data storage block.
Figure 8:
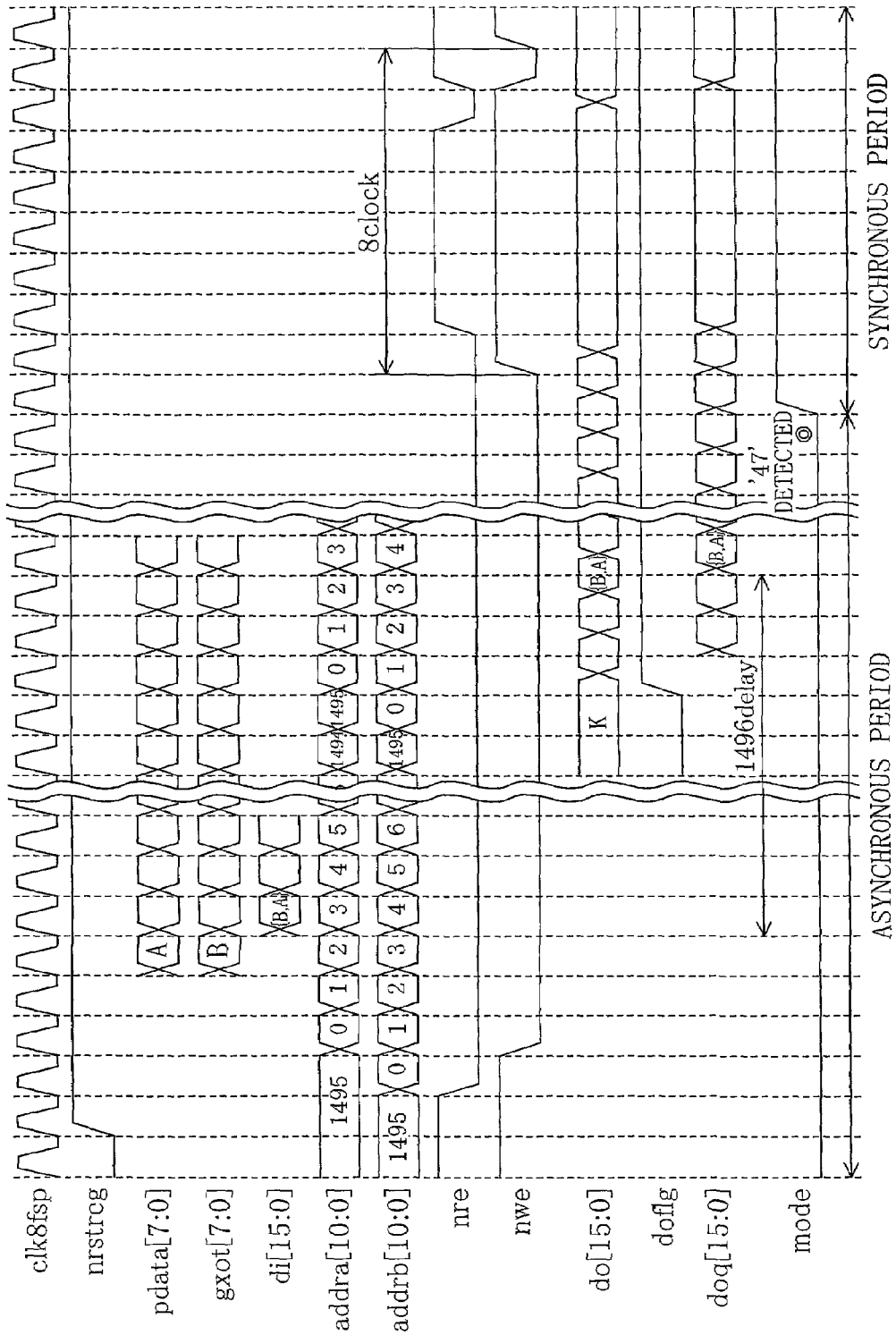
FIG. 8 is a diagram illustrating an operation timing chart of the data storage block.

FIG. 7A illustrates a configuration of the data storage block 3, FIG. 7B illustrates changes over time of the data in the data storage block 3, and FIG. 8 illustrates an input/output timing chart. The data storage block (RAM) 3 receives data di[15:0] (16-bit byte) as illustrated in FIG. 7A. The input data di[15:0] is obtained through a bit connecting operation with the output data pdatai[7:0] (8-bit byte) from the data rearrangement block 1 being the lower bits and the output data gxot[7:0] (8-bit byte) from the first calculation block 10 in the parity check block 2 being the upper bits. The RAM 3 also receives a read enable signal nre, a write enable signal nwe, a read address addrb[10:0] and a write address addra[10:0]. As can be seen from FIG. 7B, the write address addra[10:0] is obtained by delaying the read address addrb[10:0] by 1 clock, so that a read operation performed on one address is immediately followed by a write operation on the same address. The read enable signal nre and the write enable signal nwe are always at low (low-active) during an asynchronous period, and are transitioned to low only when correct data is received, i.e., once for every 8 clocks, during a synchronous period. The input data di[15:0] received by the RAM 3 is output as output data do[15:0] after it is delayed by 1496 clocks from when it is input to the RAM 3. The output data do[15:0] is taken in by the parity check block 2 as data doq[15:0] that is obtained by delaying (latching) the output data do[15:0] by 1 clock, and data of the upper 8 bits of the output data do[15:0], i.e., the output data gxot[7:0] from the first calculation block 10, is subjected to the calculation by the second calculation block 11.

As described above, according to the present embodiment, 7-bit byte data is converted to 8-bit byte data by the data rearrangement block 1, and is input to the parity check block 2 and the data storage block 3. In this way, in the parity check block 2, a sync detection operation can be performed by performing calculations by 8-bit bytes while a parity check operation can be performed by performing calculations by 8-bit bytes. Moreover, the data storage block 3 can also handle data by 8-bit bytes. Thus, data can be handled consistently by 8-bit bytes throughout the process starting from the data calculation operation to the transport stream output operation.

The method for computing by 8-bit bytes according to the present invention can be implemented as software with a CPU being used as hardware. Thus, the method can be implemented in the form of an error and sync detection method that, as software, enables 8-bit byte processes.

What is claimed is:

1. An error and sync detection device, comprising:
a data rearrangement block for receiving 7-bit byte data and converting the 7-bit byte data to 8-bit byte data;
a parity check block for receiving the 8-bit byte data, which has been converted by the data rearrangement block, and performing an MPEG sync byte detection operation and a parity-check-based error detection operation using the received byte data; and
a data storage block, capable of receiving/outputting 8-bit byte data, for receiving and storing the 8-bit byte data, which has been converted by the data rearrangement block, and 8-bit intermediate byte data produced during a calculation process for the MPEG sync byte detection operation and the parity-check-based error detection operation performed by the parity check block,
wherein the parity check block includes a first calculation block and a second calculation block for performing a predetermined syndrome computation including an operation of delaying data by a predetermined number of clocks;
the first calculation block receives the 8-bit byte data that is output from the data rearrangement block, and performs a calculation therewith before the operation of delaying the data by a predetermined number of clocks, so as to output intermediate byte data to the data storage block, the intermediate byte data representing a result of the calculation; and
the second calculation block receives the intermediate byte data from the data storage block, and performs the calculation therewith before the operation of delaying the data by a predetermined number of clocks, so as to output 8-bit byte data that has undergone the MPEG sync byte detection operation and the parity-check-based error detection operation.

2. The error and sync detection device of claim 1, wherein where pdatai[7:0] denotes input 8-bit byte data, gxot[7:0] denotes data representing a result of a calculation that is performed using the byte data pdatai[7:0], gxot7d[7:0] denotes 8-bit byte data obtained by delaying the calculation result data gxot[7:0] by 7 clocks according to a predetermined reference clock, gx[7:0] denotes an 8-bit intermediate variable that is used in a process of obtaining the calculation result data gxot[7:0], and "^" denotes an exclusive OR operation between bits, the first calculation block calculates the respective bits gx[7], gx[6], gx[5], gx[4], gx[3], gx[2], gx[1] and gx[0] of the 8-bit intermediate variable gx[7:0] respectively by the following expressions:

gx[0]=gxot7d[0];

gx[1]=gxot7d[1];

gx[2]=gxot7d[2]^gxot7d[0];

gx[3]=gxot7d[3]^gxot7d[1]^gxot7d[0];

gx[4]=gxot7d[4]^gxot7d[2]^gxot7d[1];

gx[5]=gxot7d[5]^gxot7d[3]^gxot7d[2];

gx[6]=gxot7d[6]^gxot7d[4]^gxot7d[3]; and gx[7]=gxot7d[7]^gxot7d[5]^gxot7d[4]^gxot7d[0], and the first calculation block calculates the respective bits gxot[7], gxot[6], gxot[5], gxot[4], gxot[3], gxot[2], gxot[1] and gxot[0] of the calculation result data gxot[7:0] respectively by the following expressions using the intermediate variable gx[7:0]:

gxot[7]=gx[7]^pdatai[7];

gxot[6]=gx[7]^gx[6]^pdatai[7]^pdatai[6];

gxot[5]=gx[7]^gx[6]^gx[5]^pdatai[7]^pdatai[6]^pdatai[5];

gxot[4]=gx[7]^gx[6]^gx[5]^gx[4]^pdatai[7]^pdatai[6]^pdatai[5]^pdatai[4];

$$gxot[3]=gx[7]\hat{\ }gx[6]\hat{\ }gx[5]\hat{\ }gx[4]\hat{\ }gx[3]\hat{\ }pdatai[7]$$
$$\hat{\ }pdatai[6]\hat{\ }pdatai[5]\hat{\ }pdatai[4]\hat{\ }pdatai[3];$$

$$gxot[2]=gx[6]\hat{\ }gx[5]\hat{\ }gx[4]\hat{\ }gx[3]\hat{\ }gx[2]\hat{\ }pdatai[6]$$
$$\hat{\ }pdatai[5]\hat{\ }pdatai[4]\hat{\ }pdatai[3]\hat{\ }pdatai[2];$$

$$gxot[1]=gx[5]\hat{\ }gx[4]\hat{\ }gx[3]\hat{\ }gx[2]\hat{\ }gx[1]\hat{\ }pdatai[5]$$
$$\hat{\ }pdatai[4]\hat{\ }pdatai[3]\hat{\ }pdatai[2]\hat{\ }pdatai[1]; \text{ and}$$

$$gxot[0]=gx[4]\hat{\ }gx[3]\hat{\ }gx[2]\hat{\ }gx[1]\hat{\ }gx[0]\hat{\ }pdatai[4]$$
$$\hat{\ }pdatai[3]\hat{\ }pdatai[2]\hat{\ }pdatai[1]\hat{\ }pdatai[0].$$

3. The error and sync detection device of claim 1, wherein where dobx[7:0] denotes input 8-bit byte data, btox1[7:0] denotes data representing a result of a calculation that is performed using the byte data dobx[7:0], dobx7d[7:0] denotes 8-bit byte data obtained by delaying the input byte data dobx[7:0] by 7 clocks according to a predetermined reference clock, bx[7:0] denotes an 8-bit intermediate variable that is used in a process of obtaining the calculation result data btox1[7:0], gxot1d[7:0] denotes 8-bit byte data obtained by delaying the calculation result data gxot[7:0] from the first calculation block by 1 clock according to the reference clock, and "^" denotes an exclusive OR operation between bits, the second calculation block calculates the respective bits bx[7], bx[6], bx[5], bx[4], bx[3], bx[2], bx[1] and bx[0] of the 8-bit intermediate variable bx[7:0] respectively by the following expressions:

$$bx[0]=dobx7d[0];$$
$$bx[1]=dobx7d[1];$$
$$bx[2]=dobx7d[2];$$
$$bx[3]=dobx7d[3];$$
$$bx[4]=dobx7d[4];$$
$$bx[5]=dobx7d[5]\hat{\ }dobx[1];$$
$$bx[6]=dobx7d[6]\hat{\ }dobx[2]; \text{ and}$$
$$bx[7]=dobx7d[7]\hat{\ }dobx[3]\hat{\ }dobx[1],$$

the second calculation block calculates the respective bits btox1[7], btox1[6], btox1[5], btox1[4], btox1[3], btox1[2], btox1[1] and btox1[0] of the calculation result data btox1[7:0] respectively by the following expressions:

$$btox1[7]=bx[7]\hat{\ }dobx[0];$$
$$btox1[6]=bx[6]\hat{\ }bx[0]\hat{\ }dobx[7];$$
$$btox1[5]=bx[5]\hat{\ }dobx[7]\hat{\ }dobx[6];$$
$$btox1[4]=bx[4]\hat{\ }bx[0]\hat{\ }dobx[6]\hat{\ }dobx[5];$$
$$btox1[3]=bx[3]\hat{\ }dobx[7]\hat{\ }dobx[5]\hat{\ }dobx[4];$$
$$btox1[2]=bx[2]\hat{\ }dobx[6]\hat{\ }dobx[4]\hat{\ }dobx[3];$$
$$btox1[1]=bx[1]\hat{\ }dobx[5]\hat{\ }dobx[3]\hat{\ }dobx[2]; \text{ and}$$
$$btox1[0]=bx[0]\hat{\ }dobx[4]\hat{\ }dobx[2]\hat{\ }dobx[1],$$

the second calculation block calculates 8-bit byte data bxot2[7:0], representing a result of a calculation that is performed based on the calculation result data btox1[7:0] and the calculation result data gxot[7:0] from the first calculation block, by the following expression:

$$bxot2[7:0]=btox1[7:0]\hat{\ }gxot1d[7:0].$$

4. The error and sync detection device of claim 1, wherein the data storage block receives the 8-bit byte data from the data rearrangement block and 8-bit byte data representing the result of the calculation performed by the first calculation block, and outputs the two 8-bit byte data after holding the two 8-bit byte data respectively for predetermined periods of time.

5. An error and sync detection method comprising:

a data rearrangement step of receiving 7-bit byte data and converting the 7-bit byte data to 8-bit byte data; and a parity check step of receiving the 8-bit byte data, which has been converted in the data rearrangement step, performing a syndrome calculation using the received byte data, temporarily storing 8-bit intermediate byte data produced during the calculation process in a data storage device, and continuing to perform the syndrome calculation using the intermediate byte data stored in the data storage device, thus performing an MPEG sync byte detection operation and a parity-check-based error detection operation, wherein the parity check step includes a first calculation step and a second calculation step for performing a predetermined syndrome computation including an operation of delaying data by a predetermined number of clocks;

the first calculation step includes the step of receiving the 8-bit byte data, which has been converted in the data rearrangement step, and performing a calculation therewith before the operation of delaying the data by a predetermined number of clocks, so as to output 8-bit intermediate byte data to the data storage device, the 8-bit intermediate byte data representing a result of the calculation; and the second calculation step includes the step of receiving the intermediate byte data from the data storage device, and performing the calculation therewith before the operation of delaying the data by a predetermined number of clocks, so as to output 8-bit byte data that has undergone the MPEG sync byte detection operation and the parity-check-based error detection operation.

6. The error and sync detection method of claim 5, wherein in the first calculation step, where pdatai[7:0] denotes input 8-bit byte data, gxot[7:0] denotes data representing a result of a calculation that is performed using the byte data pdatai[7:0], gxot7d[7:0] denotes 8-bit byte data obtained by delaying the calculation result data gxot[7:0] by 7 clocks according to a predetermined reference clock, gx[7:0] denotes an 8-bit intermediate variable that is used in a process of obtaining the calculation result data gxot[7:0], and "^" denotes an exclusive OR operation between bits, the respective bits gx[7], gx[6], gx[5], gx[4], gx[3], gx[2], gx[1] and gx[0] of the 8-bit intermediate variable gx[7:0] are calculated respectively by the following expressions:

$$gx[0]=gxot7d[0];$$
$$gx[1]=gxot7d[1];$$
$$gx[2]=gxot7d[2]\hat{\ }gxot7d[0];$$
$$gx[3]=gxot7d[3]\hat{\ }gxot7d[1]\hat{\ }gxot7d[0];$$
$$gx[4]=gxot7d[4]\hat{\ }gxot7d[2]\hat{\ }gxot7d[1];$$
$$gx[5]=gxot7d[5]\hat{\ }gxot7d[3]\hat{\ }gxot7d[2];$$

gx[6]=gxot7d[6]^gxot7d[4]^gxot7d[3]; and gx[7]=gxot7d[7]^gxot7d[5]^gxot7d[4]^gxot7d[0], and the respective bits gxot[7], gxot[6], gxot[5], gxot[4], gxot[3], gxot[2], gxot[1] and gxot[0] of the calculation result data gxot[7:0] are calculated respectively by the following expressions using the intermediate variable gx[7:0]:

gxot[7]=gx[7]^pdatai[7];

gxot[6]=gx[7]^gx[6]^pdatai[7]^pdatai[6];

gxot[5]=gx[7]^gx[6]^gx[5]^pdatai[7]^pdatai[6]^pdatai[5];

gxot[4]=gx[7]^gx[6]^gx[5]^gx[4]^pdatai[7]^pdatai[6]^pdatai[5]^pdatai[4];

gxot[3]=gx[7]^gx[6]^gx[5]^gx[4]^gx[3]^pdatai[7]^pdatai[6]^pdatai[5]^pdatai[4]^pdatai[3];

gxot[2]=gx[6]^gx[5]^gx[4]^gx[3]^gx[2]^pdatai[6]^pdatai[5]^pdatai[4]^pdatai[3]^pdatai[2];

gxot[1]=gx[5]^gx[4]^gx[3]^gx[2]^gx[1]^pdatai[5]^pdatai[4]^pdatai[3]^pdatai[2]^pdatai[1]; and gxot[0]=gx[4]^gx[3]^gx[2]^gx[0]^pdatai[4]^pdatai[3]^pdatai[2]^pdatai[1]^pdatai[0].

7. The error and sync detection method of claim 5, wherein in the second calculation step, where dobx[7:0] denotes input 8-bit byte data, btox1[7:0] denotes data representing a result of a calculation that is performed using the byte data dobx[7:0], dobx7d[7:0] denotes 8-bit byte data obtained by delaying the input byte data dobx[7:0] by 7 clocks according to a predetermined reference clock, bx[7:0] denotes an 8-bit intermediate variable that is used in a process of obtaining the calculation result data btox1[7:0], gxot1d[7:0] denotes 8-bit byte data obtained by delaying the calculation result data gxot[7:0] from the first calculation step by 1 clock according to the reference clock, and ^ denotes an exclusive OR operation between bits, the respective bits bx[7], bx[6], bx[5], bx[4], bx[3], bx[2], bx[1] and bx[0] of the 8-bit intermediate variable bx[7:0] are calculated respectively by the following expressions:

bx[0]=dobx7d[0];

bx[1]=dobx7d[1];

bx[2]=dobx7d[2];

bx[3]=dobx7d[3];

bx[4]=dobx7d[4];

bx[5]=dobx7d[5]^dobx[1];

bx[6]=dobx7d[6]^dobx[2]; and bx[7]=dobx7d[7]^dobx[3]^dobx[1], the respective bits btox1[7], btox1[6], btox1[5], btox1[4], btox1[3], btox1[2], btox1[1] and btox1[0] of the calculation result data btox1[7:0] are calculated respectively by the following expressions:

btox1[7]=bx[7]^dobx[0];

btox1[6]=bx[6]^bx[0]^dobx[7];

btox1[5]=bx[5]^dobx[7]^dobx[6];

btox1[4]=bx[4]^bx[0]^dobx[6]^dobx[5];

btox1[3]=bx[3]^dobx[7]^dobx[5]^dobx[4];

btox1[2]=bx[2]^dobx[6]^dobx[4]^dobx[3];

btox1[1]=bx[1]^dobx[5]^dobx[3]^dobx[2]; and btox1[0]=bx[0]^dobx[4]^dobx[2]^dobx[1]; and 8-bit byte data bxot2[7:0], representing a result of a calculation that is performed based on the calculation result data btox1[7:0] and the calculation result data gxot[7:0] from the first calculation step, is calculated by the following expression:

bxot2[7:0]=btox1[7:0]^gxot1d[7:0].

8. The error and sync detection method of claim 5, wherein the parity check step includes the steps of:
  storing 8-bit byte data successively passed from the data rearrangement step to the first calculation step in the data storage device, and holding the 8-bit byte data in the data storage device for a predetermined period of time;
  storing 8-bit byte data representing a result of a calculation in the first calculation step in the data storage device; and
  passing the 8-bit byte data representing the result of the calculation in the first calculation step from the data storage device to the second calculation step after holding the 8-bit byte data in the data storage device for the predetermined period of time.

* * * * *